United States Patent Office 3,365,470
Patented Jan. 23, 1968

3,365,470
HALO - SUBSTITUTED POLYHYDRODIALKANO-
TRICYCLIC DICARBOXYLIC ACIDS, DERIVA-
TIVES AND A METHOD OF PREPARATION
THEREOF
Louis Schmerling, Riverside, Ill., assignor to Universal
Oil Products Company, Des Plaines, Ill., a corporation
of Delaware
No Drawing. Filed May 8, 1964, Ser. No. 366,166
9 Claims. (Cl. 260—346.6)

ABSTRACT OF THE DISCLOSURE

As new compounds suitable as flame retardants and other uses, chloro- or bromo-polyhydrodialkanotricyclic dicarboxylic acids, anhydrides, hydrocarbyl esters, alkali metal salts and alkaline earth metal salts of said acids, such as 1,2,3,4,5,6,7,8,11,11,12,12-dodecachloro-1,4,4a,4b, 5,8,8a,9,10,10a - decahydro - 1,4,5,8 - dimethano - 9, 10-phenanthrene dicarboxylic anhydride.

This invention relates to novel compositions of matter comprising halo-substiuted polyhydrodialkanotricyclic dicarboxylic acids and derivatives thereof and to a process for the preparation of said acids or derivatives.

It has now been discovered that halo-substituted cycloalkadienes, and particularly polyhalo-substituted conjugated cycloalkadienes, may be condensed with dihydrophthalic acids or derivatives thereof in which the acids or anhydrides are characterized by containing a hydrogen atom on each of the doubly bonded carbon atoms in a Diels-Alder type condensation to prepare compounds or compositions of matter which possess many particular and desirable physical properties which make these compounds commercially attractive to industry. For example, the halo-substituted polyhydrodialkanotricyclic dicarboxylic acids or derivatives thereof resulting from the process of this invention will possess flame-retardant properties and may therefore be utilized as a starting material, or as one of the components, in the preparation of flame-retardant resins and plastics. These finished resins or plastics, by possessing the aforementioned flame-retardant properties, may be utilized in places where the flame-retardant property is of special advantage. An example of this is utilizing a plastic or resins in places which are normally subject to excessive heat or possible flames such as architectural paneling for construction work, wall plugs for electrical connections, switch gear equipment, printed circuits, etc. Other uses for these plastics or resins include theater and stadium seats, automobile and truck bodies, boat manufacturing, synthetic fabrics, etc. In addition, the aforementioned acid or derivative thereof may also be used as a component in the preparation of polyurethane foams which are characterized by lightness and possess a high degree of flame resistance thereby making the foams valuable for applications where such insulation must also be fire proof, such insulations being used in buildings, refrigerated truck bodies, or freight cars, etc., or as an architectural coating for sound deadening purposes.

In addition to the aforementioned uses in the preparation of flame-retardant resins and plastics, the halo-substituted polyhydrodialkanotricyclic dicarboxylic acid or derivative thereof will also possess insecticidal properties, especially against houseflies.

It is therefore an object of this invention to provide a process for the preparation of novel compositions of matter which find a wide variety of uses in the chemical field.

A further object of this invention is to prepare novel compositions of matter comprising halo-substituted polyhydrodialkanotricyclic dicarboxylic acids or derivative thereof.

In a broad aspect one embodiment of this invention is found in a compound selected from the group consisting of halo-substituted polyhydrodialkanotricyclic dicarboxylic acids and derivative thereof in which the halogen is selected from the group consisting of chlorine and bromine.

A further embodiment of this invention is found in a process for the preparation of a compound selected from the group consisting of halo-substituted polyhydrodialkanotricyclic dicarboxylic acids and derivatives thereof which comprises reacting a halo-substituted cycloalkadiene in which the halogen is selected from the group consisting of chlorine and bromine with a compound selected from the group consisting of dihydrophthalic acids and derivatives thereof, said acids and derivatives being characterized by containing a hydrogen atom on all of the doubly bonded carbon atoms in a Diels-Alder type condensation at a temperature in the range of from about 50° to about 250° C., and recovering the resultant compound.

A specific embodiment of this invention is found in a halo-substituted polyhydrodialkanophenanthrene dicarboxylic anhydride in which the halogen is selected from the group consisting of chlorine and bromine.

A more specific embodiment of this invention resides in 1,2,3,4,5,6,7,8,11,11,12,12 - dodecachloro - 1,4,4a,4b,5,8, 8a,9,10,10a - decahydro - 1,4,5,8 - dimethano - 9,10 - phenanthrene dicarboxylic anhydride.

Yet another specific embodiment of this invention is found in a process for the preparation of a chloro-substituted polyhydrodialkanotricyclic dicarboxylic acid which comprises reacting hexachlorocyclopentadiene with 1,4-dihydroterephthalic acid at a temperature in the range of from about 50° to about 250° C., and recovering the resultant 1,2,3,4,5,6,7,8,11,11,12,12 - dodecachloro - 1,4,4a,5,8, 8a,9,9a,10,10a - decahydro - 1,4,5,8 - dimethano - 9,10-anthracene dicarboxylic acid.

Other objects and embodiments will be found in the following further detailed description of this invention.

As hereinbefore set forth, it has now been discovered that novel compositions of matter comprising halo-substituted polyhydrodialkanotricyclic dicarboxylic acids and derivative thereof may be prepared by condensing a halo-substituted conjugated cycloalkadiene with a dihydrophthalic acid or anhydride thereof to form the desired product. For purposes of this invention the following terms as used in the specification and appended claims will refer to the defined meanings: (1) "halo-substituted polyhydrodialkanotricyclic dicarboxylic acids and derivatives" will refer to both mono- and polyhalo-substituted acids and derivatives; (2) "dihydrophthalic acid" will refer to both 1,2-dihydrophthalic acid and 1,4-dihydroterephthalic; (3) "dihydrophthalic anhydride" will refer to the 1,2-dihydro compound; (4) "cyclic" will refer to rings containing 6 carbon atoms; and (5) "cycloalkadiene," "cyclopentadiene" and "cyclohexadiene" will refer to the respective conjugated dienes. In addition, the term "derivatives" will include anhydrides, esters and salts of the halo-substituted polyhydrodialkanotricyclic dicarboxylic acids.

Examples of halo-substituted cycloalkadienes which may be used in the process of this invention, in which the halogen is selected from the group consisting of chlorine and bromine atoms, include chloro-substituted 1,3-cyclopentadienes (hereinafter referred to as cyclopentadienes) such as 1-chlorocyclopentadiene, 2-chlorocyclopentadiene, 1,2-dichlorocyclopentadiene, 1,5-dichlorocyclopentadiene, 1, 2,3-trichlorocyclopentadiene, 1,2,3,4-tetrachlorocyclopentadiene, 1,2,3,4,5-pentachlorocyclopentadiene, hexachlorocyclopentadiene, bromo-substituted cyclopentadienes such as 1-bromocyclopentadiene, 1,2-dibromocyclopentadiene, 1,2,3-tribromocyclopentadiene, 1,2,3,4 - tetrabromocyclopentadiene, 1,2,3,4,5 - pentabromocyclopentadiene, hexabromocyclopentadiene, chloro-substituted 1,3-cyclohexadienes (hereinafter referred to as cyclohexadienes) such as 1-chlorocyclohexadiene, 1,2-dichlorocyclohexadiene, 1,3-dichlorocyclohexadiene, 4,5-dichlorocyclohexadiene, 4,6-dichlorocyclohexadiene, 1,2,3-trichlorocyclohexadiene, 1,2,4-trichlorocyclohexadiene, 1,2,3,4-tetrachlorocyclohexadiene, pentachlorocyclohexadiene, hexachlorocyclohexadiene, octachlorocyclohexadiene, bromo-substituted cyclohexadienes such as 1-bromocyclohexadiene, 1,2-dibromocyclohexadiene, 1,3-dibromocyclohexadiene, 4,5-dibromocyclohexadiene, 4,6-dibromocyclohexadiene, 1,2,3-tribromocyclohexadiene, 1,2,4-tribromocyclohexadiene, 1,2,3,4-tetrabromocyclohexadiene, pentabromocyclohexadiene, hexabromocyclohexadiene, octabromocyclohexadiene, etc. In addition it is also contemplated within the scope of this invention that the cyclopentadienes and cyclohexadienes containing more than one species of halogen substituents may also be used, although not necessarily with equivalent results, such compounds including 1-chloro-2-bromocyclopentadiene, 1,2-dichloro-5,5-dibromocyclopentadiene, 2,3 - dichloro - 5,5 - dibromocyclopentadiene, 1-chloro-2-bromocyclohexadiene, 1,2 - dichloro-3-bromocyclohexadiene, 1,2-dichloro - 3,4 - dibromocyclohexadiene, etc.

Dihydrophthalic acids or anhydride thereof, characterized by containing a hydrogen atom on each of the doubly bonded carbon atoms, which are condensed with the aforementioned halo-substituted conjugated cycloalkadienes, include 1,2-dihydrophthalic acid, 1,2-dihydrophthalic anhydride and 1,4-dihydroterephthalic acid. These acids may be prepared by the reduction of the corresponding phthalic acids or anhydride with an alkali metal such as sodium in liquid ammonia in the presence of an alcohol such as methyl alcohol, ethyl alcohol, propyl alcohol, etc. as a proton source. In addition it is also contemplated that dihydrophthalic acids may also be obtained by the reaction of sodium amalgam with an aqueous solution of phthalic acid and sodium acetate. They may further be prepared by the electrolytic reduction of the acids.

It is also contemplated within the scope of this invention that derivatives of the dihydrophthalic acids of the type hereinbefore set forth may also be used. These derivatives, besides the anhydride of 1,2-dihydrophthalic acid, include esters, particularly the simple esters such as the alkyl, cycloalkyl, aryl, aralkyl and alkaryl esters which may be generically termed "hydrocarbyl esters"; and salts, particularly the salts of the alkali metals and alkaline earth metals, said metals being preferred because of relatively lower cost and greater availability. Specific examples of esters include the mono- and dimethyl 1,2-dihydrophthalates, mono- and diethyl 1,4-dihydroterephthalates, mono- and dicyclohexyl 1,2-dihydrophthalates, mono- and diphenyl 1,4-dihydroterephthalates, mono- and dibenzyl 1,2-dihydrophthalates, mono- and ditolyl 1,4-dihydroterephthalates, etc. In general, hydrocarbyl groups containing from 1 to about 10 carbon atoms are preferred. Salts of the aforementioned acids which are to be used include in particular the sodium, potassium, calcium and magnesium dihydrophthalates. It is to be understood that the aforementioned esters and salts are only representative of the class of compounds which may be used, and that the present invention is not necessarily limited thereto.

The condensation reaction between the halo-substituted cycloalkadiene of the type hereinbefore set forth in greater detail and the dihydrophthalic acids or derivative thereof takes place in a Diels-Alder type reaction and may be effected at elevated temperatures in the range of from about 50° to about 250° C., the preferred range being from about 100° to about 200° C. In addition the reaction may also be effected at pressures ranging from atmospheric up to about 100 atmospheres or more, the pressure being sufficient so as to maintain a major portion of reactants in the liquid phase at the reaction temperature. The reactants are usually present in such a molar ratio of from 2 to about 4 moles of halo-substituted cycloalkadiene per mole of dihydrophthalic acid or derivative thereof. An example of this type of condensation is illustrated by the following equation in which 2 moles of hexachlorocyclopentadiene are reacted with 1 mole of 1,2-dihydrophthalic anhydride to prepare 1,2,3,4,5,6,7,8,11,11,12,12 - dodecachloro - 1,4,4a,4b,5,8,8a,9,10,10a - decahydro - 1,4,5,8 - dimethano - 9,10 - phenanthrene dicarboxylic anhydride:

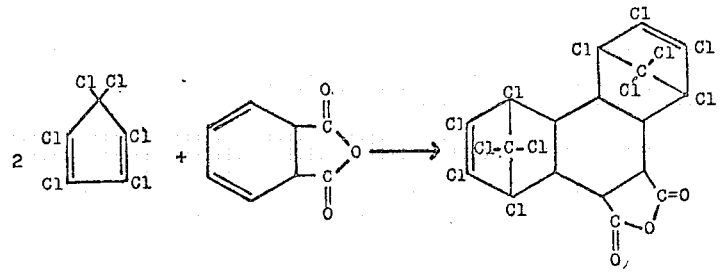

The process of the present invention may be effected in any suitable manner and may comprise either a batch or continuous type operation. For example, when a batch type operation is used, a quantity of the starting materials comprising the halo-substituted conjugated cycloalkadiene and the dihydrophthalic acid or derivative, usually in an approximately 2:1 mole ratio of cycloalkadiene to acid or derivative, is placed in a reaction vessel such as an alkylating flask, a rotating autoclave, etc. The reaction may, if so desired, be effected in the presence of an inert organic solvent such as benzene, toluene, the xylenes, methylcyclohexane, n-hexane, n-heptane, the dimethyl ether of ethylene glycol, the diethyl ether of diethylene glycol, etc. If superatmospheric pressures are to be used, the reaction vessel is sealed and an inert gas such as nitrogen is pressed in until the desired pressure is reached. Following this the reaction vessel is heated to the desired temperature and maintained thereat for a predetermined residence time which may be from about 30 minutes up to about 10 hours or more. Upon completion of the reaction the reactor and contents thereof are allowed to cool to room temperature and the desired reaction or condensation product comprising the halo-substituted polyhydrodialkanotricyclic dicarboxylic acid or derivative is separated from any unreacted starting materials and/or side reactions by conventional means, for example, fractional distillation, crystallization, etc.

It is also contemplated within the scope of this invention that the novel compositions of matter thereof may also be prepared in a continuous manner of operation. When this type of operation is used, the starting materials comprising the halo-substituted conjugated cycloalkadiene and the dihydrophthalic acid or derivative in a mole ratio similar to that hereinbefore set forth are continuously charged to a reaction zone which is maintained at the proper operating conditions of temperature and pressure. If an organic solvent or diluent is used, said solvent may be admixed with one or both of the starting materials prior to entry into said reactor. After a predetermined residence time has been completed, the condensation product is continuously withdrawn and separated from the reactor effluent, the starting materials which have been separated being recycled for further use as a portion of the feed stock.

Examples of halo-substituted polyhydrodialkanotricyclic dicarboxylic acids or derivatives thereof which comprise novel compositions of matter and are prepared according to the process herein described include 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylic anhydride, 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylic acid, 1,2,3,4,5,6,7,8,11,11,12,12-dodecachloro-1,4,4a,5,8,8a,9,9a,10,10a-decahydro-1,4,5,8-dimethano-9,10-anthracene dicarboxylic acid, 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylic anhydride, 1,2,3,4,5,6,7,8,11,11,12,12-dodecabromo-1,4,4a,5,8,8a,9,9a,10,10a-decahydro-1,4,5,8-dimethano-9,10-anthracene dicarboxylic acid, 1,2,3,4,5,6,7,8-octachloro-1,4,4a,4b,5,8,8a,9,10,10a-decahydro-1,4,5,8-dimethano-9,10-phenanthrene dicarboxylic anhydride, 1,2,3,4,5,6,7,8-octachloro-1,4,4a,4b,5,8,8a,9,10,10a-decahydro-1,4,5,8-dimethano-9,10-phenanthrene dicarboxylic acid, 1,2,3,4,5,6,7,8-octachloro-1,4,4a,5,8,8a,9,9a,10,10a-decahydro-1,4,5,8-dimethano-9,10-anthracene dicarboxylic acid, 1,2,3,4,5,6,7,8-octabromo-1,4,4a,4b,5,8,8a,9,10,10a-decahydro-1,4,5,8-dimethano-9,10-phenanthrene dicarboxylic anhydride, 1,2,3,4,5,6,7,8-octabromo-1,4,4a,4b,5,8,8a,9,10,10a-decahydro-1,4,5,8-dimethano-9,10-phenanthrene dicarboxylic acid, 1,2,3,4,5,6,7,8-octabromo-1,4,4a,5,8,8a,9,9a,10,10a-decahydro-1,4,5,8-dimethano-9,10-anthracene dicarboxylic acid, 1,2,3,4,5,6,7,8-octachloro-11,11,12,12-tetrabromo-1,4,4a,4b,5,8,8a,9,10,10a-decahydro-1,4,5,8-dimethano-9,10-phenanthrene dicarboxylic anhydride, 1,2,3,4,5,6,7,8-octachloro-11,11,12,12-tetrabromo-1,4,4a,4b,5,8,8a,9,10,10a-decahydro-1,4,5,8-dimethano-9,10-phenanthrene dicarboxylic acid, 1,2,3,4,5,6,7,8-octachloro-11,11,12,12-tetrabromo-1,4,4a,5,8,8a,9,9a,10,10a-decahydro-1,4,5,8-dimethano-9,10-anthracene dicarboxylic acid, monomethyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, diethyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, monomethyl 1,2,3,4,5,6,7,8,11,11,12,12-dodecachloro-1,4,4a,5,8,8a,9,9a,10,10a-decahydro-1,4,5,8-dimethano-9,10-anthracene dicarboxylate, monophenyl 1,2,3,4,5,6,7,8,11,11,12,12-dodecachloro-1,4,4a,4b,5,5,8,8a,9,10,10a-decahydro-1,4,5,8-dimethano-9,10-phenanthrene dicarboxylate, dibenzyl 1,2,3,4,5,6,7,8,11,11,12,12-dodecachloro-1,4,4a,5,8,8a,9,9a,10,10a-decahydro-1,4,5,8-dimethano-9,10-anthracene dicarboxylate, monotolyl 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, sodium 1,2,3,4,5,6,7,8,11,11,12,12-dodecachloro-1,4,4a,5,8,8a,9,9a,10,10a-decahydro-1,4,5,8-dimethano-9,10-anthracene dicarboxylate, potassium 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, calcium 1,2,3,4,5,6,7,8,11,11,12,12-dodecachloro-1,4,4a,5,8,8a,9,9a,10,10a-decahydro-1,4,5,8-dimethano-9,10-anthracene dicarboxylate, magnesium 1,2,3,4,5,6,7,8,11,11,12,12-dodecachloro-1,4,4a,4b,5,8,8a,9,10,10a-decahydro-1,4,5,8-dimethano-9,10-phenanthrene dicarboxylate, monomethyl 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, diethyl 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, monomethyl 1,2,3,4,5,6,7,8,11,11,12,12-dodecabromo-1,4,4a,5,8,8a,9,9a,10,10a-decahydro-1,4,5,8,-dimethano-9,10-anthracene dicarboxylate, monophenyl 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, dibenzyl 1,2,3,4,5,6,7,8,11,11,12,12-dodecabromo-1,4,4a,5,8,8a,9,9a,10,10a-decahydro-1,4,5,8-dimethano-9,10-anthracene dicarboxylate, monotolyl 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, sodium 1,2,3,4,5,6,7,8,11,11,12,12-dodecabromo-1,4,4a,5,8,8a,9,9a,10,10a-decahydro-1,4,5,8-dimethano-9,10-anthracene dicarboxylate, potassium 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, calcium 1,2,3,4,5,6,7,8,11,11,12,12-dodecabromo-1,4,4a,5,8,8a,9,9a,10,10a-decahydro-1,4,5,8-dimethano-9,10-anthracene dicarboxylate, magnesium 1,2,3,4,5,6,7,8,11,11,12,12-dodecabromo-1,4,4a,4b,5,8,8a,9,10,10a-decahydro-1,4,5,8-dimethano-9,10-phenanthrene dicarboxylate, monomethyl 1,2,3,4,5,6,7,8-octachloro-1,4,4a,4b,5,8,8a,9,10,10a-decahydro-1,4,5,8-dimethano-9,10-phenanthrene dicarboxylate, monomethyl 1,2,3,4,5,6,7,8-octachloro-1,4,4a,5,8,8a,9,9a,10,10a-decahydro-1,4,5,8-dimethano-9,10-anthracene dicarboxylate, dibenzyl 1,2,3,4,5,6,7,8-octachloro-1,4,4a,5,8,8a,9,9a,10,10a-decahydro-1,4,5,8-dimethano-9,10-anthracene dicarboxylate, sodium 1,2,3,4,5,6,7,8-octachloro-1,4,4a,5,8,8a,9,9a,10,10a-decahydro-1,4,5,8-dimethano-9,10-anthracene dicarboxylate, calcium 1,2,3,4,5,6,7,8-octachloro-1,4,4a,5,8,8a,9,9a,10,10a-decahydro-1,4,5,8-dimethano-9,10-anthracene dicarboxylate, etc.

It is to be understood that the aforementioned compounds are merely representatives of the class of compounds which may be prepared according to the process herein described and that this invnetion is not necessarily limited thereto. Illustrative examples showing compounds containing only 2, 4, 6, etc. chloro- or bromo-substituents have been omitted for purposes of brevity.

It is contemplated within the scope of this invention that the derivatives of the dihydrophthalic acids, especially the esters and salts, may be prepared by either of two methods. For example, one method of preparing the esters or salts of the desired product is to react a hydroxy-substituted alkyl, cycloalkyl, aryl, alkaryl or aralkyl compound with the dihydrophthalic acids or anhydride such as 1,2-dihydrophthalic acid, 1,2-dihydrophthalic anhydride, or 1,4-dihydroterephthalic acid to prepare the monoester of the dihydrophthalic acid. Alternatively, if a diester is desired, the reaction is effected in the presence of an acidic catalyst. Likewise, the desired salt of the acid may be prepared in a conventional manner utilizing an alkali metal or alkaline earth metal compound. Following this the ester or salt is then condensed with the halosubstituted conjugated cycloalkadiene in a manner similar to that hereinbefore set forth to prepare the desired derivative of the halo-substituted polyhydrodialkanotricyclic dicarboxylic acid.

Another method of preparing the desired derivative of the halo-substituted polyhydrodialkanotricyclic dicarboxylic acid is to treat the desired halo-substituted polyhydrodialkanotricyclic dicarboxylic acid or anhydride in a manner similar to that set forth in the above paragraph, that is, by reacting the halo-substituted polyhydrodialkanotricyclic dicarboxylic acid or anhydride with a hydroxy-substituted organic compound of the type hereinbefore set forth either in the absence or presence of an acidic catalyst to prepare either the mono- or diester of the acid. Likewise, the salt of the halo-substituted polyhydrodialkanotricyclic dicarboxylic acid or anhydride may be prepared in a manner similar to that hereinbefore set forth.

Examples of polymeric compositions of matter including the halo-substituted polyhydrodialkanotricyclic dicarboxylic acids or derivatives as one component thereof comprise mixtures of prepolymers which contain at least one reactive functional group, said reactive functional group being capable of reacting with the halo-substituted polyhydrodialkanotricyclic dicarboxylic acid or derivative thereof to form the desired product. These prepolmers are generically referred to as epoxy resins, urethanes, polyamides, polyamines, polyols, polyesters, etc. The particular halo-substituted polyhydrodialkanotricyclic dicarboxylic acid or derivative thereof will act to a certain extent as a curing agent or a cross-linking agent and thus enable the finished product to possess the desired physical characteristics and stability to possible deterioration. For example, the particular halo-substituted polyhydrodialkanotricyclic dicarboxylic acid or derivative may be used as a curing agent for epoxy resins which are formed by the reaction of a 1,2-epoxy compound and a dihydric phenol or polyalcohol to form polyethers usually having alternating aromatic and aliphatic centers. A particularly applicable epoxy resin is formed by the reaction of epichlorohydrin with the condensation product of phenol and acetone, the latter being known in the trade as Bisphenol A. This epoxy resin is uncured and is a relatively low molecular weight polymer which possesses a high degree of polarity, the polar groups of the resin including the ether linkages, the secondary hydroxyl groups and the terminal epoxide groups. The uncured epoxy resin must thereafter be cured in order to form the desired final product which will possess the physical characteristics necessary for its use in various applications, one such desirable characteristic being the ability to resist or retard flames when the final epoxy resin is to be used under circumstances whereby it may be subjected to flames, such as when being used near high temperature surfaces, sources of heat, in electrical contacts, etc.

The aforementioned halo-substituted polyhydrodialkanotricyclic dicarboxylic acid or derivative will react with the uncured epoxy resin by condensing with the reactive epoxy or oxirane group present in the molecule to form a cross-linked tridimensional structure which, as hereinbefore set forth, in the final state will possess the desired characteristic of being flame resistant or retardant.

Another polymer which may be reacted with the acid or derivative of the type hereinbefore set forth comprises the polyurethane in which the reactive functional group is an isocyanate end group. The particular polymer to be treated with the acid or derivative may be prepared by reacting a polyester with an excess of an isocyanate such as tolylene diisocyanate to form a polymer which will be a linear, low molecular weight product. This polymer is then cured by reaction with a halo-substituted polyhydroalkanotricyclic dicarboxylic acid or derivative, the addition of the acid or derivative resulting in the cross-linking or chain extension of the polymer to give high molecular weight compounds. In addition these compounds may also be prepared in foam form by incorporating a foaming agent such as water, alcohol, etc. during the curing step.

Yet another example of polymers containing an excess of at least one reactive functional group which may be reacted with the halo-substituted polyhydrodialkanotricyclic dicarboxylic acid or derivative comprises polyamides. These polyamides may be prepared by condensing a polyamine with a dibasic acid and thereafter cross-linking the polyamide with a halo-substituted polyhydrodialkanotricyclic dicarboxylic acid or derivative. In addition, polyesters which have been formed by the reaction of a dibasic acid, unsaturated in nature, with a molar excess of a glycol or with a polyhydroxy compound which contains more than 2 —OH groups may be cross-linked utilizing a halo-substituted polyhydrodialkanotricyclic dicarboxylic acid or derivative thereof to form the desired products such as alkyds which may be used as coatings or for molding or casting.

In addition to being utilized as cross-linking or curing agents with polymeric compositions of matter, the halo-substituted polyhydrodialkanotricyclic dicarboxylic acids or derivatives may also be utilized in reaction with at least one reactive polyfunctional organic intermediate to prepare desired polymers; for example, the halo-substituted polyhydrodialkanotricyclic dicarboxylic acid or derivative as such or admixed with another dibasic acid or anhydride may be condensed with glycols such as ethylene glycol, propylene glycol, etc.; amines such as ethylene diamine, hexamethylene dimaine, etc.; dibasic acids or anhydrides such as maleic acid, phthalic acid, adipic acid, etc.; unsaturated esters such as diallylphthalate, etc.; lactams such as caprolactam, etc.; to form the desired polymeric compositions of matter which possess excellent fire resistant properties.

In addition to the aforementioned uses as an intermediate in the preparation of flame retardant resins and plastics, it is also contemplated within the scope of this invention that the halo-substituted polyhydrodialkanotricyclic dicarboxylic acids or derivatives thereof may be utilized as insecticides and insect repellents, the physical properties of these acids and anhydrides and the effects they have on entomological forms of life making them particularly desirable for this use. They are, for example, toxic to insects which are destructive of plant life and materials normally subject to insect infestation, their toxic effects being manifested by contact of the poison with the insect. The insecticides comprising the present compounds are thus effective against chewing as well as sucking types of insects. The compounds are sufficiently volatile so that when applied to plant life intended for subsequent human consumption, the plants, when harvested and after allowing a reasonable time for evaporation of the applied insecticide therefrom, retain none of the toxicant to prevent use of the plant for consumption of food. On the other hand, the compounds are of sufficiently limited volatility to be retained on the insect for the time required to accomplish the toxic effects of the compounds. The volatility and retentive capacity of the compounds may be varied at will by combining them with suitable fixing agents which reduce or promote their volatilization, as desired. Thus, the compounds may be dissolved in a suitable high boiling solvent, such as a mineral or vegetable oil, petroleum, etc.; a wax, such as paraffin wax, beeswax, etc.; a high molecular weight alcohol or ether such as myricyl alcohol, dibutyl ether, an aqueous alkali solution, etc.; or they may be emulsified with water or combined with an oil and emulsified with water by the addition of an emulsifying agent such as a surface active agent to the mixture of components. The latter solvents and dispersants may also be employed for the specific purpose of reducing the concentration of insecticide to the desired level in a specific insecticidal formulation. The particular formulation of active components in combination with the solvent or dispersant will depend upon its application. Compositions containing as high as 20% of active component may be preferred in some instances where deep penetration of the insecticide is desired, as in the treatment of fibrous material such as wood for extinction of a particular infestation, for example, wood termites. For other purposes the required concentration of active component in the formulation may be as low as 0.1% as, for example, in the treatment of vapors for destroying moth larvae.

In utilizing the present compounds against most insects, a composition containing from about 0.1 to about 5% by weight of active component is highly effective. The choice of the most desirable solvent or dispersant further depends upon the method utilized to apply the insecticidal composition to the infested article. For example, a low molecular weight, normally gaseous-carrying agent for the active insecticidal composition such as propane, butane, the Freons, etc. may be compressed and liquefied into a small bomb containing the insecticide. Upon release of pressure from the bomb, the liquefied carrier vaporizes and suspends a quantity of the active component thereon, thus providing a convenient spraying method for applying the insecticide. The active component may also be dissolved in a liquid carrier such as kerosene, an alcohol, ester, ketone, etc., and the resulting solution atomized by a suitable spraying device.

The following examples are given to illustrate the process of the present invention which, however, are not intended to limit the generally broad scope of the present invention in strict accordance therewith.

EXAMPLE I

A glass liner containing a mixture of 75 grams (0.5 mole) of 1,2-dihydrophthalic anhydride, 285 grams (1.0 mole) of hexachlorocyclopentadiene and 200 cc. of toluene is sealed into an autoclave. The autoclave and contents thereof are heated to a temperature of about 150°–170° C. and maintained thereat for a period of about 4 hours. At the end of this time the autoclave and contents thereof are allowed to cool to room temperature, any excess pressure which has been built up is vented and the reaction product comprising 1,2,3,4,5,6,7,8,11,11,12,12-dodecachloro - 1,4,4a,4b,5,8,8a,9,10,10a - decahydro-1,4,5,8-dimethano-9,10-phenanthrene dicarboxylic anhydride is separated and recovered by fractional crystallization.

EXAMPLE II

In this example a mixture comprising 84 grams (0.5 mole) of 1,2-dihydrophthalic acid, 285 grams (1.0 mole) of hexachlorocyclopentadiene and 150 cc. of toluene is placed in the glass liner of a rotating autoclave. The glass liner is sealed in the autoclave which is thereafter heated to a temperature of about 175° C. and maintained thereat for a period of about 6 hours. At the end of the reaction time the autoclave and contents thereof are allowed to cool to room temperature, the excess pressure, if any, is vented and the autoclave is opened. The desired reaction product comprising 1,2,3,4,5,6,7,8,11,11,12,12 - dodecachloro-1,4,4a,4b,5,8,8a,9,10,10a-decahydro - 1,4,5,8 - dimethano-9,10-phenanthrene dicarboxylic acid is separated from any unreacted starting materials by conventional means such as distillation of the unreacted hexachlorocyclopentadiene and fractional crystallization of the reaction product.

EXAMPLE III

A mixture comprising 84 grams (0.5 mole) of 1,4-dihydroterephthalic acid, 285 grams (1.0 mole) of hexachlorocyclopentadiene and 200 cc. of xylene is placed in the glass liner of a rotating autoclave. The liner is then placed in the autoclave in which is thereafter sealed and heated to a temperature of about 165° C. for a period of about 6 hours. At the end of this time the autoclave and contents thereof are cooled to room temperature, the autoclave is opened and the desired reaction product comprising 1,2,3,4,5,6,7,8,11,11,12,12 - dodecachloro-1,4,4a,5,8,8a,9,9a,10,10a - decahydro - 1,4,5,8-dimethano-9,10-anthracene dicarboxylic acid is separated and recovered by fractional crystallization.

EXAMPLE IV

A mixture of 276 grams (0.5 mole) of hexabromocyclopentadiene, 37.5 grams (0.25 mole) of 1,2-dihydrophthalic anhydride and 150 cc. of toluene is placed in a glass liner which is thereafter sealed into a rotating autoclave. The autoclave and contents thereof are heated to a temperature of about 175° C. and maintained thereat for a period of about 6 hours. At the end of this time the autoclave and contents thereof are cooled to room temperature, the autoclave is opened and the desired reaction product comprising 1,2,3,4,5,6,7,8,11,11,12,12-dodecabromo - 1,4,4a,4b,5,8,8a,9,10,10a - decahydro-1,4,5,8-dimethano-9,10-phenanthrene dicarboxylic anhydride is separated and recovered by conventional means.

EXAMPLE V

In this example a mixture of 276 grams (0.5 mole) of hexabromocyclopentadiene and 42 grams (0.25 mole) of 1,4-dihydroterephthalic acid along with 150 cc. of toluene is treated in a manner similar to that set forth in the above examples. Upon completion of the desired residence time in the autoclave, the autoclave and contents thereof are cooled to room temperature, the autoclave is opened and the desired product comprising 1,2,3,4,5,-6,7,8,11,11,12,12-dedocabromo - 1,4,4a,5,8,8a,9,9a,10,10a-decahydro-1,4,5,8 - dimethano-9,10-anthracene dicarboxylic acid is separated and recovered by conventional means.

EXAMPLE VI

In this example a mixture of 108 grams (0.5 mole) of 1,2,3,4-tetrachlorocyclopentadiene and 37.5 grams (0.25 mole) of 1,2-dihydrophthalic anhydride along with 150 cc. of toluene is treated in a manner similar to that set forth in the above examples. Upon completion of the desired residence time in the autoclave, the autoclave and contents thereof are cooled to room temperature, the autoclave is opened and the desired product comprising 1,2,3,4,5,6,7,8 - octachloro - 1,4,4a,4b,5,8,8a,9,10,10a-decahydro-1,4,5,8-dimethano-9,10-phenanthrene dicarboxylic anhydride.

I claim as my invention:

1. A compound selected from the group consisting of halosubstituted 1,4,4a,5,8,8a,9,9a,10,10a - decahydro-1,4,-5,8-dialkano-9,10-anthracene dicarboxylic acids; halosubstituted 1,4,4a,4b,5,8,8a,9,10,10a - decahydro - 1,4,5,8-dialkano-9,10-phenanthrene dicarboxylic acids; their anhydrides, alkali metal salts, and alkaline earth metal salts, and hydrocarbyl esters thereof, wherein hydrocarbyl contains up to 10 carbons and is free of aliphatic unsaturation, alkano has 1 to 2 carbons, halo is chlorine or bromine, the halogen is not located on a carbon atom of the center ring, and the halogens are evenly distributed in number on the two outer rings.

2. 1,2,3,4,5,6,7,8,11,11,12,12 - dodecachloro-1,4,4a,4b,-5,8,8a,9,10,10a-decahydro - 1,4,5,8 - dimethano-9,10-phenanthrene dicarboxylic anhydride.

3. 1,2,3,4,5,6,7,8,11,11,12,12 - dodecachloro - 1,4,4a,-4b,5,8,8a,9,10,10a-decahydro - 1,4,5,8 - dimethano-9,10-phenanthrene dicarboxylic acid.

4. 1,2,3,4,5,6,7,8,11,11,12,12 - dodecachloro - 1,4,4a,-5,8,8a,9,9a,10,10a-decahydro - 1,4,5,8-dimethano-9,10-anthracene dicarboxylic acid.

5. 1,2,3,4,5,6,7,8,11,11,12,12 - dodecabromo - 1,4,4a,-4b,5,8,8a,9,10,10a - decahydro-1,4,5,8 - dimethano-9,10-phenanthrene dicarboxylic anhydride.

6. 1,2,3,4,5,6,7,8,11,11,12,12 - dodecabromo - 1,4,4a,-5,8,8a,9,9a,10,10a - decahydro-1,4,5,8 - dimethano-9,10-anthracene dicarboxylic acid.

7. A process for the preparation of a chlorosubstituted polyhydrodialkanotricyclic dicarboxylic acid which comprises reacting hexachlorocyclopentadiene with 1,2-dihydrophthalic acid at a temperature in the range of from about 50° to about 250° C., and recovering the resultant 1,2,3,4,5,6,7,8,11,11,12,12 - dodecachloro - 1,4,4a,4b,5,8,-8a,9,10,10a-decahydro - 1,4,5,8-dimethano - 9,10-phenanthrene dicarboxylic acid.

8. A process for the preparation of a chloro-substituted polyhydrodialkanotricyclic dicarboxylic anhydride which comprises reacting hexachlorocyclopentadiene with 1,2,-dihydrophthalic anhydride at a temperature in the range of from about 50° to about 250° C., and recovering the resultant 1,2,3,4,5,6,7,8,11,11,12,12 - dodecachloro - 1,4,-4a,4b,5,8,8a,9,10,10a-decahydro - 1,4,5,8-dimethano-9,10-phenanthrene dicarboxylic anhydride.

9. A process for the preparation of a bromo-substituted polyhydrodialkanotricyclic dicarboxylic acid which comprises reacting hexabromocyclopentadiene with 1,2-dihydrophthalic acid at a temperature in the range of from about 50° to about 250° C., and recovering the resultant 1,2,3,4,5,6,7,8,11,11,12,12 - dodecabromo - 1,4,4a,4b,5,8,-8a,9,10,10a-decahydro - 1,4,5,8 - dimethano-9,10-phenanthrene dicarboxylic acid.

References Cited
UNITED STATES PATENTS 3,121,738   2/1964   Fields _____ 260—514

ALTON D. ROLLINS, *Primary Examiner.*

B. DENTZ, *Assistant Examiner.*